MULTISTAGE END-MARKED FOLDED FERREED SWITCHING NETWORK

Filed Jan. 5, 1967 2 Sheets-Sheet 1

INVENTORS F. D. KEEFER
L. E. THELEMAQUE
H. J. WALSH
BY
ATTORNEY

United States Patent Office 3,515,810
Patented June 2, 1970

3,515,810

MULTISTAGE END MARKED FOLDED FERREED SWITCHING NETWORK

Frank D. Keefer, Mullica Hill, N.J., Louis E. Thelemaque, Brooklyn, N.Y., and Henry J. Walsh, Somerville, N.J., assignors to Bell Telephone Laboratories, Incorporated, Murray Hill and Berkeley Heights, N.J., a corporation of New York Filed Jan. 5, 1967, Ser. No. 607,504
Int. Cl. H04q 3/42
U.S. Cl. 179—18 4 Claims

ABSTRACT OF THE DISCLOSURE

A two-stage, end-marked, folded switching network which utilizes partially folded combinations of triangular and rectangular matrices of differentially wound ferreed switches in the first stage and fully folded triangular matrices in the second stage. Selective network control is accomplished by end-marking selected first stage input terminals and by link selection at the fold of a selected second stage switch array. Inputs to the same first stage switch matrix are connectable without utilizing the remainder of the network.

This invention is directed to communications switching networks and the selective control thereof. Switching networks have been characterized as folded and nonfolded. A nonfolded or two-sided network is one wherein lines and trunks are terminated at opposite ends of the network. A folded or one-sided network is one wherein all lines and trunks are terminated only on the first switching stage thereof. Usually, in folded type networks the output terminals of the last switching stage are permanently interconnected. Connections between lines and trunks are completed by establishing a U-shaped transmission path which includes a first transmission path through all stages of the network from a first stage input terminal to a last stage output terminal, the permanent connection from the last stage output terminal to another last stage output terminal and a second transmission path through all stages of the network from the other last stage output terminal to a first stage input terminal. Full bidirectional flexibility of interconnection of lines and trunks is available in this network configuration. However, the requirement of two complete transmission path connections through all stages of the network for the completion of each call exerts a substantial limitation upon the traffic handling capacity of this type of network.

It is an object of this invention to reduce the number of individual crosspoint connections required for the establishment of a transmission path between input terminals of a multistage folded switching network.

Traffic demand on a communications system is proportional to the number of calls originated by the stations and trunks terminated on the switching network of the system. Often there are certain groups of lines and/or trunks which have a high community of interest, i.e., require that call connections be established between lines and trunks within a particular group more often than with other lines and trunks. Where such a high calling rate exists within a specific group of lines or trunks, utilization of the full multistage switching capabilities and concentration of an entire switching network is not efficient or economical.

It is another object of this invention further to reduce the number of individual cross-point connections required to establish transmission connections through a multistage folded network between lines and trunks having a high community of interest so as to increase the traffic handling capacity of the entire network.

Control arrangements by means of which switching networks are caused to establish connections between selected input and output terminals thereof are relatively complex. The degree of complexity depends, inter alia, upon the organization of the network, the type of crosspoint device, the circuitry required for controlling the operation and release of individual crosspoints in the various stages of the network and the number of equipment selections which must be made to define all elements of a complete connection between selected end terminals of the network. In many prior art networks it is necessary to select and individually complete a path through each switching stage of the network, thus requiring control access to a large number of control points within a network.

It is a further object of this invention to simplify control of a folded switching network.

These and other objects of the invention are obtained in one specific illustrative embodiment thereof which comprises a fully folded two-stage, end-marked switching network utilizing combinations of triangular and rectangular matrices of selectively controllable crosspoint devices arranged in modular groups. Trunks, lines, registers, senders and other service circuits are all terminated as inputs to the primary switching stage modules. Each of the primary modules in the primary switching stage includes a triangular array of crosspoint switches which is combined with a rectangular array of crosspoints. The secondary stage consists of a plurality of secondary modules each in the form of a triangular matrix of crosspoint devices. The outputs of each primary module are fanned out through interstage links in a full distribution pattern and connected to the inputs of secondary modules so as to provide each primary module with a link to each secondary module. The secondary stage thus provides several possible connections between any two primary modules including one possible connection through each secondary module.

In accordance with a feature of our invention, if the two inputs to be connected appear on the same primary module, the connection established between them will include only a single crosspoint of that primary module. If the inputs to be connected appear on different primary modules, the connection established between them will include a single first stage crosspoint in each of the primary modules on which the inputs appear and a single second stage crosspoint of one secondary module. Accordingly, the network of our invention has a completely folded configuration wherein complete network connections can be established selectively either through a single network stage or through a plurality of network stages in accordance with the termination location of the circuits to be connected.

One type of crosspoint device which can be used advantageously in this illustrative embodiment of our invention is the differentially wound ferreed. This device has been described in a number of places in the literature including A. Feiner et al. Pat. 2,995,637, issued Aug. 8, 1961, and an article, entiled "The Ferreed—A New Switching Device" by A. Feiner, C. A. Lovell, T. N. Lowry and P. G. Ridinger appearing in the Bell System Technical Journal, vol. 39, No. 1, January 1960 at page 1. The use of ferreed crosspoint devices in multistage switching networks is described, inter alia, in T. N. Lowry Pat. 3,037,085 of May 29, 1962, W. S. Hayward, Jr. Pat. 3,110,772 of Nov. 12, 1963 and T. N. Lowry Pat. 3,231,679 of Jan. 18, 1966.

The ferreed is an electromagnetic device which is particularly suitable for use as a crosspoint device in an electronically controlled switching network. It is responsive to current pulses of extremely short time duration and its magnetic latching characteristics eliminate the necessity of providing hold windings and hold currents.

A differentially wound ferreed is equipped with two sets of control windings. When both winding sets are energized by simultaneously ending current pulses of substantially equal amplitude the contacts of the ferreed will close and magnetically latch. When only one of the two winding sets is energized the contacts of the ferreed will open and remain open until both winding sets are again energized. This form of operation is termed differential excitation.

In the past, matrices of differentially wound ferreed crosspoints have assumed a rectangular configuration. The ferreed devices are arranged in rows and columns. One winding set of a ferreed is associated with the row including the ferreed and the other winding set is associated with the column including the ferreed. The row winding sets of all ferreed crosspoints in one row are connected in series to form an input control path between an input control conductor and a common multiple. The column winding sets of all crosspoints in one column are connected in series to form an output control path between an output control conductor and the same common multiple. Input transmission paths respectively associated with the input control conductors parallel each of the input control paths. Output transmission paths respectively associated with the output control conductors parallel each of the output control paths. When current is passed through one input control path and one output control path via the common multiple, the ferreed crosspoint at the intersection of the corresponding row and column closes and latches to connect together the input and output transmission paths whose intersection is defined by the crosspoint. At the same time, current passes through only one of the two winding sets of all other ferreed crosspoints in the same row and column causing any crosspoints that are operated to release. This differential method of operation is characterized by the absence of specific crosspoint release operations. Crosspoints are released as a direct result of other crosspoints being closed and at the same time as the other crosspoints are closed, in accordance with the principles of differential excitation of ferreeds as described above.

In accordance with another feature of our invention, the triangular matrices of crosspoints which form the secondary modules of our illustratives switching network are so organized that each triangular matrix includes a column of ferreed crosspoints corresponding to each input to the matrix, except the first input, and includes a row of crosspoints corresponding to each input to the matrix, except the last input. The row winding sets of all crosspoints in a row which corresponds to an input and the column winding sets of all crosspoints in a column corresponding to the same input are connected in series to form an input control path between an input control conductor and a common multiple. Input transmission paths respectively associated with the input control conductors parallel each of these input control paths. When current is passed in one input control path and out another input control path via the common multiple, the crosspoint at the intersection of the two input control paths closes and latches to connect together the input transmission paths whose intersection is defined by the crosspoint. Also included in each input control path of a secondary module is a link selection switching device which completes the connection of the control path to the common multiple. The function of these switching devices is described later herein.

In accordance with another feature of our invention, each primary module includes a triangular matrix of ferreed crosspoints in combination with a rectangular matrix of crosspoints. Each primary module may advantageously be organized to include a column of crosspoints corresponding to each output of the rectangular portion of the matrix and an additional column of crosspoints corresponding to each input to the triangular portion of the matrix, except the first input. Each primary module also includes a row of crosspoints corresponding to each input to the triangular portion of the matrix. The column winding sets of all ferreed crosspoints in the column corresponding to an output are connected in series to form an output control path between an output control conductor and a common multiple. Output transmission paths respectively associated with the output control conductors parallel each of these output control paths. The column winding sets of all crosspoints in the column corresponding to an input of the matrix and the row winding sets of all crosspoints in the row corresponding to the same input of the matrix are connected in series to form an input control path between an input control conductor and the common multiple. Input transmission paths respectively associated with the input control conductors parallel each of these input control paths. When current is passed in through one input control path, through the common multiple and out through another input control path, the crosspoint at the intersection of the input control paths closes and latches to connect together the input transmission paths whose intersection is defined by the crosspoint. When current is passed through an output control path, through the common multiple and through an input control path of the matrix, the crosspoint at the intersection of the input and output control paths closes and latches to connect together the input and output transmission paths whose intersection is defined by the crosspoint. In either case, current passses through only one of the two winding sets of all other ferreed crosspoints in the same input and output control paths causing any crosspoints that the operated to release.

The primary and secondary modules are connected by means of interstage links including control links which connect output control conductors of the primary modules to input control conductors of the secondary modules and transmission links which parallel the control links and connect the output transmission paths of a primary module to input transmission paths of a secondary module. The interstage links are arranged so as to provide a control link and a paralleling transmission link between each primary module and each secondary module, thereby providing a plurality of possible transmission path connections between any two primary modules equivalent in number to and discretely defined by the respective secondary modules incorporated in the network.

In accordance with another feature of our invention, selection of the particular transmission path connection to be completed between selected input terminals on different primary modules is accomplished by closing the aforenoted link selection switching devices connected between the input control paths of one secondary module and the common multiple of that secondary module. The switching devices in all input control paths of one secondary module are closed simultaneously to complete the circuit of all control paths in that module. In that way, since each possible transmission connection between any two primary modules is defined by one secondary module, one entire network transmission and control path between the two selected input terminals is defined when the ling selection switching devices are closed in one secondary module. This network control path includes an input control path of one primary module, the common multiple of that primary module, an output control path of that same primary module, a control link to a selected secondary module, a first input control path of the secondary module, the operated link selection switch in the input control path, the common multiple of that secondary module, another operated link selection switch, a second input control path of the same secondary module, a control link to the other primary module, an output control path of the other primary module, the common multiple of the other primary module and an input control path of the other primary module. When current is passed between input control conductors through the above traced network control path, a crosspoint is closed and latched simultaneously in each primary and secondary module through which the control path extends. As a result, a network transmission path which parallels the network control path is established between the input transmission path of the first primary module and an input transmission path of the second primary module. This selection arrangement is characterized by end marking in combination with a single access control point within the network.

The above and other objects and features of our invention will be more readily understood from the following description when read with respect to the drawing in which.

GENERAL DESCRIPTION

Figure 1:
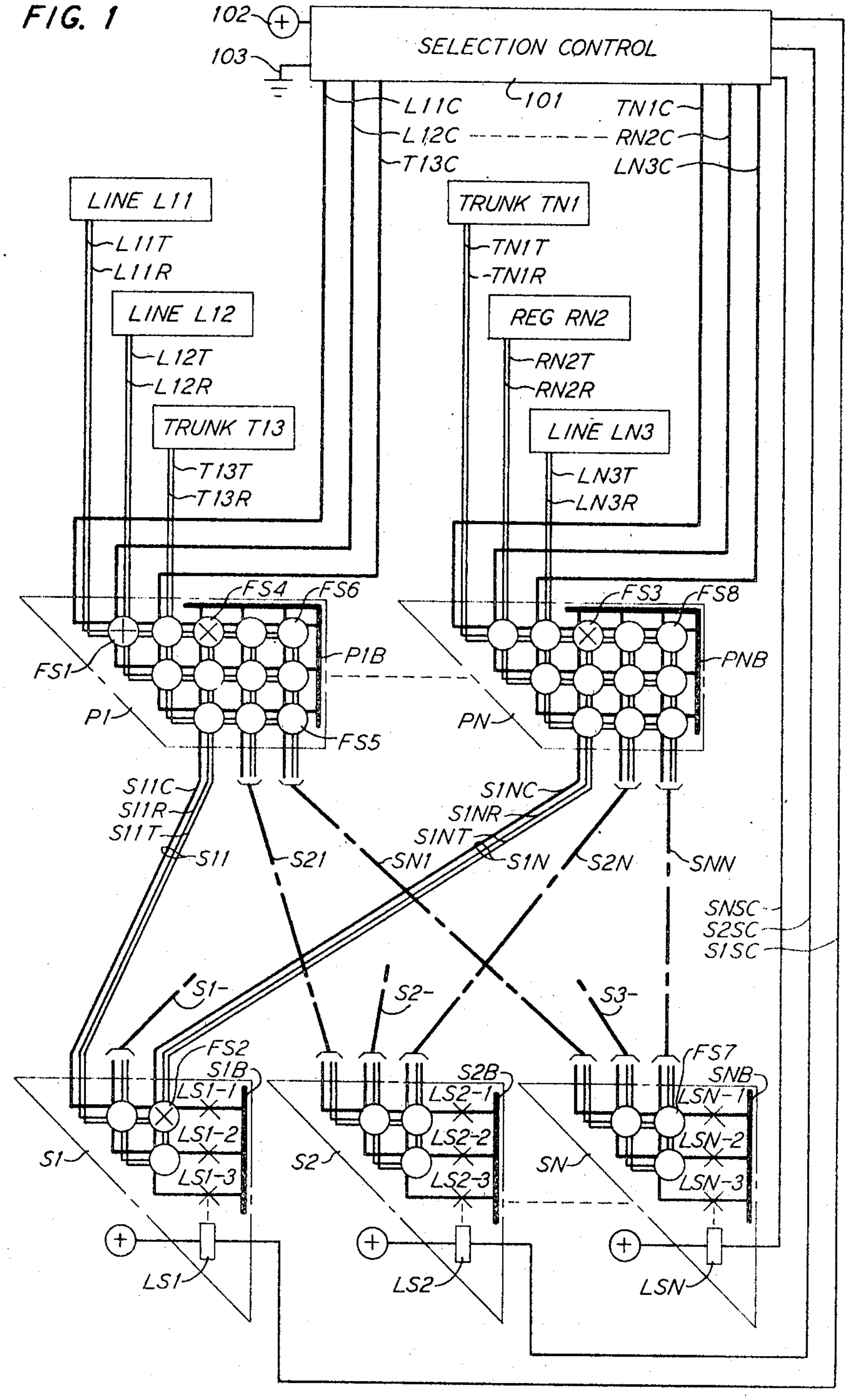
FIG. 1 is a block diagram of one illustrative switching network organized in accordance with our invention.

The illustrative network arrangement shown in FIG. 1 includes a first network stage comprising a plurality of primary modules P1–PN; a second network stage comprising a plurality of secondary modules S1–SN; a plurality of interstage links S11, S21, S1N, S2N, SNN, etc.; a plurality of input circuits such as L11, L12, L13, TN1, RN1, LN3 terminated on the respective primary modules P1–PN; and a selection control arrangement 101.

Selection control

Selection control arrangement 101 can comprise any well-known selecting circuit by means of which cooperating marking potentials (i.e., marking potentials producing current flow therebetween) are applied selectively to a plurality of output conductors. The output conductors to which potentials may be applied selectively by selection control arrangement 101 include input control conductors L11C, L12C, T13C, TN1C, RN2C and LN3C and link selection control conductors SNSC, S2SC and S1SC. As described further hereinbelow, the illustrative selection control 101 selectively applies either a positive potential or a ground potential to a selected output conductor thereof. Since the internal organixation of selection control 101 can comprise any of many well-known selecting circuit arrangements, and since details of the internal structure of internal control 101 are not necessary for an understanding of our invention, no detailed description thereof is included herein.

Input circuits

All inputs to the switching network are terminated on the first network stage. The input circuits shown in FIG. 1 merely serve to illustrate some types of circuits which can be interconnected selectively through the illustrative embodiment of the network. Examples of input circuits include line circuits such as L11, trunk circuits such as T13 and register circuits such as RN2. Other types of service circuits such as senders, tone trunks, ringing circuits, etc. also can be terminated on the network, although not shown in FIG. 1.

Primary modules

Each of the illustrative primary modules P1—PN which comprise the first stage of the switching network shown in FIG. 1 is equipped with only three inputs. Additionally, only two primary modules P1 and PN are illustrated in FIG. 1. However, it is to be understood that a larger number of inputs can be terminated on each respective primary module and that a greater number of primary modules can be provided in accordance with the principles of our invention.

Each primary module P1–PN is equipped with N inputs and M outputs. The number of inputs need not necessarily equal the number of outputs if concentration is desired. Crosspoints of each module are arranged in $N-1+M$ columns and N rows. A column of crosspoints is provided to correspond with each of the M outputs and a column of crosspoints is provided to correspond with each of the N inputs except the first input. A row of crosspoints is provided to correspond with each of the N inputs. Each column corresponding to an output includes M crosspoints. Each column corresponding to an input includes $n-1$ crosspoints where $n$ represents the numerical position of the corresponding input within the total series of N inputs. Each row includes $N+M-n$ crosspoints where $n$ represents the numerical position of the corresponding input.

In accordance with the above principles, primary module P1 of FIG. 1 is equipped with three inputs L11, L12 and T13 and three outputs S11, S21 and SN1. A column of crosspoints is provided to correspond with each of the outputs S11, S21 and SN1. A column of crosspoints also is provided to correspond to each of the inputs L12 and T13 except the first input L11. A row of crosspoints is provided to correspond with each of the inputs L12, L11 and T13. The resulting arrangement of crosspoints including three rows and five columns is illustrated in FIG. 1 as primary module P1.

Secondary modules

Each secondary module is equipped with M inputs. The crosspoints of a secondary module are arranged in $M-1$ columns and $M-1$ rows. One column of crosspoints is provided to correspond to each input except the first input and one row of crosspoints is provided to correspond to each input except the last input. Each column includes $M-1$ crosspoints and each row includes $M-m$ crosspoints, where $m$ represents the numerical position of the corresponding input within the total series of M inputs.

In accordance with the above principles, secondary module S1 of FIG. 1 is equipped with three inputs S11, S1- and S1N. A column of crosspoints is provided to correspond to each of the inputs S1-, S1N except the first input S11. A row of crosspoints is provided to correspond to each input S11, S1- except the last input S1N. The resulting triangular configuration of crosspoints including two rows and two columns is illustrated in FIG. 1 as secondary module S1.

Interstage links

The respective primary modules P1–PN are connected to the respective secondary modules S1–SN by means of interstage links S11, S-, S21, S2-, SN1, etc. These interstage links are arranged in a pattern so that each primary module is connected to each secondary module by at least one interstage link. For example, primary module P1 is connected by interstage links S11, S21 and SN1, respectively, to secondary modules S1, S2 and SN.

Network connections

The crosspoint devices arranged at the intersections of the respective rows and columns of the primary and secondary modules serve to connect together intersecting transmission paths which parallel the respective rows and columns of crosspoints. To illustrate, when crosspoint FS1 of primary module P1 is operated, the transmission path L11T and L11R extending from line L11 is connected by crosspoint FS1 to the transmission path L12T and L12R extending from line L12. Thus, in accordance with an aspect of our invention, two input circuits L11 and L12 which are terminated on the same primary module P1 can be connected together by operation of a single crosspoint FS1 in that primary module P1.

A second manner in which connections are established through the network can be illustrated by the operation of crosspoint FE4 of primary module P1, crosspoint FS2 of secondary module S1 and crosspoint FS3 of primary module PN. When crosspoint FS4 is operated, the transmission path L11T and L11R extending from line L11 is connected to the transsmission path S11T and S11R of interstage link S11 through crosspoint FS4. When crosspoint FS2 is operated, the transmission path S11T and S11R of interstage link S11 is connected to the transmission path S1NR and S1NT of interstage link S1N. When crosspoint FS3 is operated, the transmission path S1NR and S1NT of interstage link S1N is connected to the transmission path TN1T and TN-R extending from trunk TN1. Accordingly, when all of the crosspoints FS4, FS2 and FS3 are operated, line L11 is connected to trunk TN1 through primary module P1, secondary module S1 and primary module PN. As a further example, if crosspoints FS6 of primary module P1, FS7 of secondary module SN and FS8 of primary module PN were operated instead, a path between the same two input circuits line L11 and trunk TN1 would be completed through the same primary modules P1 and PN but a different secondary module SN.

As described above, the pattern of interstage link connections between primary and secondary modules provides a possible connecting path between any two primary modules through each of the secondary modules. In other words, each secondary module S1–SN defines one possible connecting path between any two primary modules.

The above described organization of primary and secondary modules and their interconnection by interstage links permits the interconnection of any two input circuits by the operation of only three crosspoints if the input circuits are terminated on different primary modules or by operation of only a single crosspoint if the input circuits are terminated on the same primary module. As a result, input circuits having a high calling rate between them can be terminated on the same primary module so as to eliminate the use of interstage links in establishing call connections therebetween. This reduction in the demand for the inclusion of interstage links in call connections reduces the blocking probability for call connections between other input circuits.

NETWORK CONTROL

Crosspoint device

Figure 3:
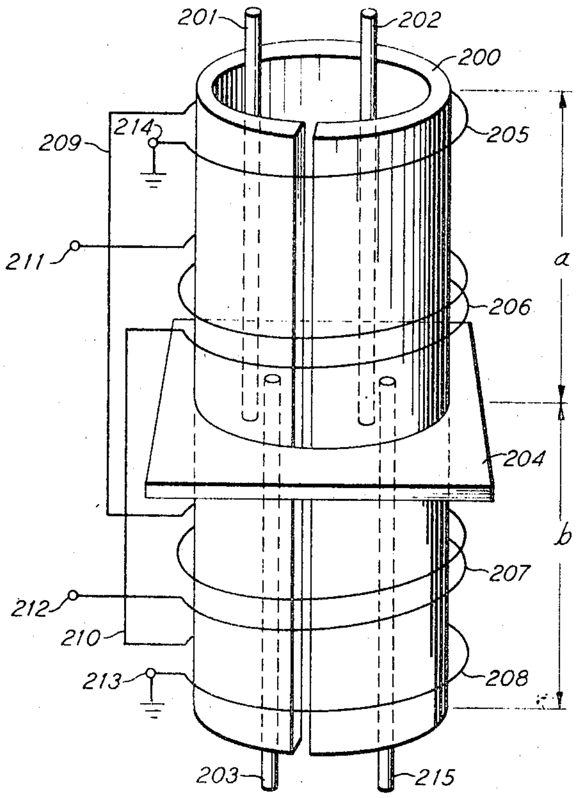
FIG. 3 is a schematic representation of one illustrative type of differentially wound ferreed.

The device selected for use as a crosspoint in this illustrative embodiment of our invention to illustrate one advantageous manner of selective network control is the differentially wound ferreed. One type of differentially wound ferreed is illustrated in FIG. 3. Reed contacts 201–203 and 204–215 are surrounded by a magnetic sleeve 200. Shunt plate 204 separates the sleeve 200 into two independent halves *a* and *b*. Windings 205 and 206 surround the upper half of upper sleeve 200; winding 206 having a larger number of turns than winding 205. Windings 207 and 208 surround the lower half *b* of sleeve 200; winding 207 having a larger number of turns than winding 208. Windings 205 and 207 are connected in series opposition as are windings 206 and 208. As previously described, when either terminal 211 or 212 is individually energized, the reed contacts 201–203 and 202–215 are opened since the two independent halves *a* and *b* of sleeve 200 are poled oppositely. However, when terminals 211 and 212 are simultaneously and equally energized the two halves *a* and *b* of sleeve 200 are poled series-aiding and contacts 201–203 and 202—215 will be closed. A more detailed description of this one illustrative structural arrangement of a ferreed is contained in A. L. Blaha et al. Pat. 3,075,059 of Jan. 22, 1963.

Crosspoint control

Figure 2:
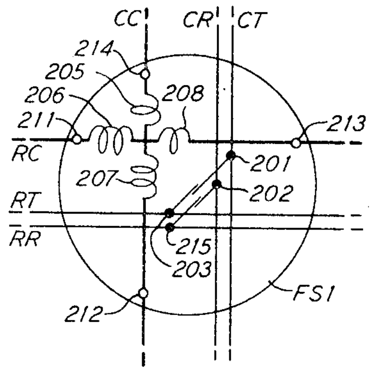
FIG. 2 is a schematic representation of the manner in which the control winding sets and the reed contacts of a differentially wound ferreed can be connected in a switching matrix.

FIG. 2 illustrates the manner in which the differentially wound ferreed device such as that shown in FIG. 3 can be connected as a crosspoint device in a network of the type shown in FIG. 1. To illustrate, assume that the schematic ferreed device shown in FIG. 2 is to be connected as crosspoint FS1 of the primary module P1 shown in FIG. 1. The transmission conductors L12T and L12R of FIG. 1 correspond to column transmission conductors CT and CR of FIG. 2. They are connected to one side of the reed contacts at terminals 201 and 202 as shown in FIG. 2. The transmission conductors L11T and L11R of FIG. 1 correspond to the row transmission conductors RT and RR of FIG. 2. They are connected to the other ends of the reed contacts at terminals 203 and 215 as shown in FIG. 2. The column control winding set 205 and 207 is connected in series with control conductor L12C which corresponds to column control conductor CC at terminal 214 of FIG. 2. The row control winding set 206 and 208 is connected in series with control conductor L11C which corresponds to row control conductor RC at terminal 211 of FIG. 2. The other end 213 of row winding set 206 and 208 is connected to the common bus P1B of primary module P1 through a control path serially including the row winding sets of all other crosspoints such as FS4 and FS6 in the same row with crosspoint FS1. This row corresponds to the first input L11 to primary module P1. The other end 212 of the column winding set 205 and 207 is connected to the common bus P1B through a control path which serially includes the row control winding sets of all other crosspoints in the second row of primary module P1. This row of crosspoints corresponds to the second input L12 to primary module P1. When the row winding set 206 and 208 and the column winding set 205 and 207 are simultaneously energized, the reed contacts 201–203 and 202–215 will be closed and latched and will connect the transmission conductors L11T and L11R respectively to the transmission conductors L12T and L12R.

Simultaneous energization of the row and column winding sets of crosspoint FS1 can be accomplished, for example, by applying ground potential to input control conductor L11C and positive potential to input control conductor L12C. A series current path can then be traced from ground potential through control conductor L11C, the row winding sets of all crosspoints in the first row of primary module P1 including that of crosspoint FS1, the common bus P1B of primary module P1, the row winding sets of all crosspoints in the second row of primary module P1, the column winding sets of crosspoint FS1 and control conductor L12C to positive potential. As a result, current passes through the row winding sets of all crosspoints in the first row of primary module P1 including crosspoint FS1, through the row winding sets of all crosspoints in the second row of primary module P1 and through the column winding set of crosspoint FS1. Crosspoint FS1 is the only crosspoint having current flow through both its row and column winding sets. Only a single winding set of each of the other crosspoints in the first and second rows of primary module P1 is energized. As a result, the contacts of crosspoint FS1 will be closed but the contacts of any other crosspoints in the first row and any crosspoints in the second row which were then latched in an operated state will be opened.

Multistage control

The network control arrangement shown in FIG. 1 includes selection control 101, link selection relays LS1, LS2 and LSN and a plurality of selectable control paths through the network which, when energized, cause appropriate crosspoints to be operated and a complete network transmission path connection to be established. Each of the possible transmission connections through the network is defined by a paralleling control path. When current is passed through this control path, the transmission connection which it parallels is established.

Each input to the network includes an input transmission path and an input control conductor. For example, input L11 includes a transmission path L11T and L11R and an input control conductor L11C. When it is desired to establish a connection between two input circuits, selection control 101 applies ground potential to the input control conductor associated with one input circuit and applies positive potential to the input control conductor associated with the other input circuit. For example, if it is desired to establish a connection between line L11 and line L12, selection control 101 will apply ground potential to control conductor L11C and positive potential to control conductor L12C. This completes a series current path between cooperating potentials (e.g., ground potential and positive potential) which includes both winding sets of crosspoint FS1 in primary module P1. The components of this control path were described earlier herein. In response to this application of cooperating marking potentials to the input control conductors associated with the input circuits to be connected, a network transmission connection is established through crosspoint FS1 between the transmission paths extending from the respective input circuits L11 and L12.

If the input circuits to be connected are not terminated on the same primary module, interstage links and the second switching stage must be employed to establish the connection. If it is assumed that line L11, which is terminated on primary module P1, and trunk TN1, which is terminated on primary module PN, are to be connected, cooperating marking potentials will be applied by selection control 101 to the input control conductors L11C and TN1C which are associated respectively with the input circuits L11 and TN1.

In the illustrative arrangement of FIG. 1, three possible control paths exist between input control conductors L11C and TN1. Each possible control path is defined by one of the secondary modules S1, S2 or SN. For example, a first control path includes the row winding sets of all crosspoints in the uppermost row of primary module P1, bus P1B, the column winding sets of all crosspoints in the middle or third column of primary module P1, control link S11C of interstage link S11, the row winding sets of all crosspoints in the uppermost or first row of secondary module S1, contact LS1–1 of relay LS1, bus S1B, contact LS1–3 of relay LS1, the column winding sets of all crosspoints in the last or rightmost column of secondary module S1, control link S1NC of interstage link S1N, the column winding sets of all crosspoints in the middle or third column of primary module PN, bus PNB and the row winding sets of all crosspoints in the uppermost or first row of primary module PN. A second control path between input control conductors L11C and TN1C can be traced through the uppermost or first row of primary module P1, bus P1B, the rightmost or last column of primary module P1, interstage link SN1, the uppermost or first row of secondary module SN, contact LSN–1 of relay LSN, bus PNB, contact LSN–3 of relay LSN, the rightmost or last column of secondary module SN, interstage link SNN, the rightmost or last column of primary module NB, bus PNB and the uppermost or first row of primary module PN. A third control path can be traced through interstage links S21 and S2N which includes contacts LS2–1 and LS2–3 of relay LS2 and bus S2B of secondary module S2.

Each one of the above control paths is discretely defined by the one secondary module S1, S2 or SN through which the control path passes and must include operated contacts of the link selection relay LS1, LS2 or LSN associated with the secondary module S1, S2 or SN through which the control path passes. Accordingly, the operation of one of the relays LS1, LS2 or LSN will complete a single series control path between the marked input control conductors associated with the input circuits to be connected. Selection control 101 can thus select the particular one of the plurality of possible paths between selected input circuits to be established by applying ground potential to one of the link selection control conductors S1SC, SNSC, S2SC to operate the link relay LS1, LS2 or LSN which defines the network connection to be established. For example, it is assumed that selection control 101 applies ground potential to link selection control conductor S1SC. Current is thereby passed through the winding of link selection relay LS1 to positive potential causing relay LS1 to operate its contacts LS1–1, LS1–2 and LS1–3. As a result, the first of the above described control paths between control conductors L11C and TN1C is completed and current is passed over this control path between the cooperating marking potentials applied to the input control conductors L11C and TN1C.

When the above traced control path is energized, current is passed simultaneously through both the row and column winding sets of crosspoint FS4 in primary module P1, crosspoint FS2 in secondary module S1 and crosspoint FS3 in primary module PN. At the same time, current passes through only a single winding set, either row or column, of all other crosspoints having a winding set serially included in the energized control path. As a result, the contacts of crosspoints FS4, FS2 and FS3 are operated and the contacts of any other crosspoints having a winding set in the energized control path are released if they were previously latched in an operated state.

A transmission path paralleling the energized control path is completed by the operation of crosspoints FS4, FS2 and FS3. The transmission connection through the network between trunk TN1 and line L11 which is established when crosspoints FS4, FS2 and FS3 are operated was described earlier herein. The transmission path will remain established until such time as a single winding set of one of the operated crosspoints FS4, FS2, FS3 is energized. This will occur when a subsequent connection through the network is established utilizing a crosspoint having a winding set connected in series with a winding set of one of the operated crosspoints FS4, FS2 or FS3.

A similar transmission connection through the network between line L11 and trunk TN1 including crosspoints FS6, FS7 and FS8 can be established when cooperating marking potentials are applied to input control conductors L11C and TN1C and link selection relay LSN is in an operated state. This latter connection would include the transmission paths which parallel the energized control path through the network. A third network connection between the same input circuits can be established through secondary module S2 by applying cooperating marking potentials to input control conductors L11C and TN1C when link selection LS2 is operated.

The above described control arrangement provides for the establishment of a complete transmission connection through the network by means of end-marking the input control conductors associated with the input circuits to be connected in combination with link selection by means of a single control operation at only one internal location within the network.

The above description of the illustrative network control arrangement does not describe any specific equipment for determining which interstage links are busy and which are idle and available for use. A number of methods for determining the busy-idle condition of interstage links and for controlling a network in accordance therewith are well known in the prior art and can be used advantageously to control the illustrative network of our invention. For example, Pat. 3,235,668 issued Feb. 15, 1966 to H. H. Abbott discloses one advantageous arrangement for selectively controlling a network in accordance with busy-idle link conditions. This arrangement utilizes an additional signaling conductor to reflect the busy-idle state of links in which the signaling conductor is included. Another arrangement for selectively controlling a network in accordance with busy-idle link information is referred to in T. N. Lowry Pat. 3,231,679 issued Jan. 25, 1965. This arrangement utilizes a separate memory which is periodically updated to reflect present busy-idle states of all components of the network and which is interrogated to ascertain and determine available connecting paths between input circuits. A number of other arrangements also are available for performing a similar function. Any of these arrangements can be adapted advantageously to provide a basis for idle link selection to the selective control of a network organized within the principles of our invention as described above.

The illustrative transmission paths shown in FIG. 1 of the drawing include only two transmission conductors. It is to be understood that such transmission paths can include any number of transmission conductors, each requiring a separate contact in each crosspoint of the network. For example, a 4-wire switching network can be organized exactly as described above in accordance with the principles of our invention when each crosspoint is equipped with four contacts rather than two. It also is to be understood that the above-described arrangements are merely illustrative of the principles of the invention, numerous other arrangements utilizing other crosspoint devices and control circuitry can be devised by those skilled in the art without departing from the spirit and scope of the invention.

What is claimed is:

1. A communications switching network comprising a first switching stage including X primary modules; each said primary module comprising N primary input terminals, M primary output terminals, a plurality of crosspoint devices each defining one of the intersections of $N-1+M$ columns and N rows and each having a row winding set and a column winding set, there being a column corresponding to each said input terminal except the first of said primary input terminals, a column corresponding to each of said M primary output terminals, and a row corresponding to each said primary input terminal, a primary input control path discretely associated with each said primary input terminal which serially includes the row winding sets of all crosspoint devices in the row corresponding to said primary input terminal and the column winding sets of all crosspoint devices in the column corresponding to said primary input terminal, a primary output control path discretely associated with each said primary output terminal which serially includes the column winding sets of all crosspoint devices in the column corresponding to said primary output terminal, one end of all said primary control paths being connected to a common multiple, a primary input transmission path connected with each said primary input terminal which parallels said primary input control path associated with said primary input terminal, a primary output transmission path connected with each said primary output terminal which parallels said primary output control path associated with said primary output terminal;

a second switching stage including M secondary modules;

each said secondary module comprising

X secondary input terminals, a plurality of crosspoint devices each defining one of the intersections $X-1$ columns and $X-1$ rows and each having a row winding set and a column winding set, there being a column corresponding to each said secondary input terminal except the first of said X secondary input terminals and a row corresponding to each said secondary input terminal except the last of said X secondary input terminals, a secondary input control path discretely associated with each said secondary input terminal which serially includes the row winding sets of all crosspoint devices in the row corresponding to said secondary input terminal and the column winding sets of all crosspoint devices in the column corresponding to said secondary input terminals, a secondary transmission path connected with each said secondary input terminal which parallels said secondary input control path associated with said secondary input terminal, means for connecting one end of all said secondary input control paths to a common multiple, switch means operative to control said connecting means to open and close connections between all said secondary input control paths and said common multiple;

interstage transmission links connecting one said primary output terminal of each said primary module with one said secondary input terminal of each said secondary module;

each said crosspoint device being responsive to coincident current through its row and column winding sets to connect together those of said transmission paths whose intersection is defined by said crosspoint device; and control means for controlling selectively said crosspoint devices of said primary and secondary modules to establish a transmission connection between selected primary input terminals comprising means for applying cooperating potentials selectively to the other ends of said primary control paths and to the other ends of said secondary input control paths, and means for controlling selectively said switch means.

2. A communications switching network in accordance with claim 1 wherein said control means comprises control links respectively paralleling said interstage transmission links and connecting said other end of one said primary output control path of each said primary module with said other end of one said secondary input control path of each said secondary module.

3. A communications switching network comprising

X primary switches each having N primary input terminals and M primary output terminals;

M secondary switches each having X secondary input terminals;

each said primary switch comprising a matrix for selectively interconnecting selected primary input terminals thereof and for connecting selected primary output terminals thereof with selected primary input terminals thereof;

each said secondary switch comprising a matrix for interconnecting selected secondary input terminals thereof;

each said primary and secondary switch comprising intersecting transmission conductors respectively connected to one of said input and output terminals of said switch, intersecting control conductors respectively corresponding to and paralleling said transmission conductors, connections between one end of all said control conductors and a common multiple, and a crosspoint device at the intersection of each two intersecting control conductors responsive to coincident energization of said two control conductors for connecting together said transmission conductors corresponding to and paralleling said two control conductors;

each said secondary switch comprising selection means for opening and closing all said connections between said common multiple thereof and said one end of all said control conductors of said secondary switch;

transmission links connecting one said primary output terminal of each said primary switch with one said secondary input terminal of each said secondary switch;

and control means for controlling selectively said crosspoint devices of said primary secondary switches to establish a transmission connection between selected primary input terminals comprising means for applying cooperating potentials selectively to the other ends of said control conductors of said primary and secondary switches, and means for controlling selectively said selection means.

4. A communications switching network in accordance with claim 3 wherein said control means comprises control links respectively corresponding to and paralleling said transmission links and connecting said other end of one said control conductor of each said primary switch with said other end of one said control conductor of each said secondary switch.

References Cited

UNITED STATES PATENTS

| | | | |
|---|---|---|---|
| 3,110,772 | 11/1963 | Hayward. | |
| 3,234,335 | 2/1966 | Keister. | |
| 3,317,897 | 5/1967 | Ceonzo et al. | 340—166 |

KATHLEEN H. CLAFFY, Primary Examiner

W. A. HELVESTINE, Assistant Examiner